July 31, 1951     A. C. BUENSOD     2,562,375
HUMIDITY CONTROL
Filed April 1, 1948
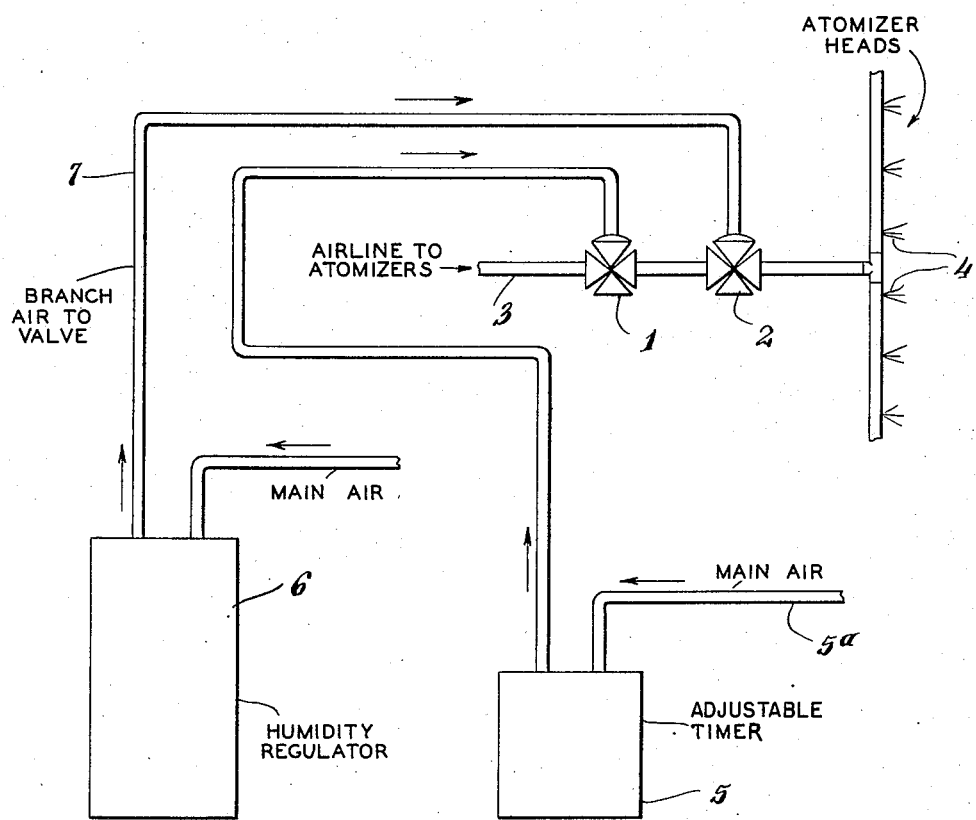
INVENTOR.
*Alfred C. Buensod*
BY
*Fraser, Myers & Manley,*
ATTORNEYS.

Patented July 31, 1951

2,562,375

UNITED STATES PATENT OFFICE 2,562,375

HUMIDITY CONTROL

Alfred C. Buensod, New York, N. Y., assignor to Buensod-Stacey, Inc., New York, N. Y., a corporation of Delaware Application April 1, 1948, Serial No. 18,380

5 Claims. (Cl. 236—44)

1

The present invention relates to the method of and apparatus for controlling and maintaining the relative humidity of the air within a given space within comparatively narrow prescribed limits.

In textile mill work and other industrial operations where the quality or working of a product is materially affected by changes in relative humidity in the air surrounding the station where the product is being made or operated upon, it has long been customary to provide year round conditions of temperature and relative humidity best suitable for the particular process and material being acted upon. Difficulty, however, has been encountered in maintaining the relative humidity within prescribed narrow limits. The means usually employed for maintaining the relative humidity in the conditioned space within prescribed limits consists of an apparatus which includes a humidity regulator or hygrostat which would sense the humidity change and acting through a relay would operate to turn water atomizer heads on or off.

Notwithstanding the sensitiveness of the humidity regulators, the conditions prevailing throughout the space where the prescribed humidity conditions were desired and those at the instrument were not identical, due to many variables, such as lack of proper distribution of the air or radiation resulting from machines, walls, windows, electric lights, etc., hence when the regulator may be calling for the addition of moisture, the particular space being conditioned may already have a higher relative humidity than that indicated at the control instrument. Although an atomizer disperses the water in as finely divided particles as is practicable so that the sensible heat in the air will vaporize the water, nevertheless if free water is atomized for too long a period into a room, there is always danger that the sensible heat generated in the room may not be sufficient to completely vaporize and diffuse the water throughout the space to be conditioned, wherefore wet down will take place. This is particularly so since as a practicable consideration atomizers can only operate from 30 to 40 seconds in any one position without causing wet down.

The principal object of the present invention is to provide a control for relative humidity conditions within a given space within very narrow limits, say, ±2% of a prescribed relative humidity. This I accomplish by means comprising a humidity regulator control and mechanically controlled means so coordinated to provide a

2 system of cycling consisting of alternately atomizing water into the space for a definite interval of time and shutting off said atomization for a definite interval of time to permit equalization of the vapor pressure in said space produced by such addition of water and stopping the atomization period of the cycling when the relative humidity in said space is at the higher of the prescribed limits and again resorting to the atomization cycling when the relative humidity in the space drops to the lower of the prescribed limits. By such method of cycling, over-humidification and wet down as well as under-humidification are prevented. The invention will be better understood from the detailed description which follows when considered in connection with the accompanying drawing which diagrammatically illustrates an operative arrangement of the apparatus.

The apparatus, which is mounted in the conditioned space, comprises control means herein shown as a pair of atomizer head operating valves 1 and 2 disposed in an air line 3 connecting with a moisture source herein indicated as a plurality of atomizer heads 4. The valves 1 and 2 may be of any type of blow-through valve well known in the art adapted to permit air pressure from line 3 to pass therethrough to the atomizer heads when the valves are simultaneously open and to preclude such passage of air pressure when either of the valves are closed.

The opening and closing of valve 1 may be controlled by any suitable means herein shown as a timer 5 of any well known type which is adjustable to vary the intermittent time intervals during which the valve will be open or closed to the passage of air from line 3, the timer being of a type which will intermittently permit the passage of air under pressure from air line 5a to the valve 1 to open the latter to the passage of air pressure from line 3.

The opening and closing of valve 2 is controlled by a humidity regulator 6 of any efficient type which is sensitive to the relative humidity of the air in the space to be conditioned. The humidity regulator shown is of the pneumatic type and preferably of the reverse acting type, i. e., one which will increase the air pressure in the branch line 7 from the regulator on a decrease in humidity in contact with the hygroscopic element (not shown) at the regulator 6. Hence, upon a drop in the relative humidity at the regulator, the air pressure in branch line 7 will increase to a value sufficient to open valve 2 to the flow of air pressure from line 3. However, during the period when valve 2 is open, air pressure from line 3 will only flow to the atomizer head 4 during the intervals when valve 1 is open. And as the open or "on" period of valve 1 can be adjusted, it will be evident that said period can be so chosen as to insure against wet down in the space below the atomizer heads, while at the same time insure adequate humidification of the space, notwithstanding any slight differential between the relative humidity at the regulator and at the operating station whereat the desired relative humidity is to be maintained.

With a cycling system as described it will be appreciated that closer tolerances in relative humidity of a space to be humidity conditioned can be maintained than with any system which is dependent solely upon a humidity regulator.

Accordingly, while I have shown and described a system and means for maintaining the relative humidity of air within a given space within prescribed narrow limits, it will be understood that any types of timers and humidity regulators may be employed in the general arrangement and operation of the system and that the passage of any fluid such as water or steam may be controlled by the valves 1 and 2 or their equivalents for atomization into the space to be conditioned without departing from the spirit of my invention. The terms "atomization" and "atomizing" are used in their broadest sense to define any method or means whereby water particles or water vapor may be introduced into a space in a state which will facilitate its vaporization and diffusion.

What I claim is:

1. An apparatus for controlling and maintaining the relative humidity of air within a given space within prescribed limits, comprising a system including therein a fluid pressure supply line to a moisture source adapted to be operated upon by fluid from said supply line to atomize moisture into the given space, compound control valve means in said fluid supply line, a humidity regulator for controlling the opening and closing of one of the controls of said compound control valve means, and means for intermittently opening and closing the other of the controls of said compound control means, the controls of said compound control means being so related that the fluid supply will only reach the moisture source when both controls are simultaneously open.

2. An apparatus for controlling and maintaining the relative humidity of air within a given space within prescribed limits, comprising a system including therein an air pressure supply line to a moisture source adapted to be operated upon by air pressure from said air pressure supply line, two control valves in said air supply line to atomize moisture into the given space, a humidity regulator for controlling the opening and closing of one of said control valves and mechanical means for intermittently opening and closing the other of said control valves, said valves being so disposed that the air supply will only reach the moisture source when both control valves are simultaneously open.

3. An apparatus according to claim 2 wherein the mechanical means for opening and closing the control valve is adjustable to vary the open and closed time intervals of said control valve.

4. An apparatus according to claim 2 wherein the opening and closing of the valve controlled by the humidity regulator is responsive to relative humidity in the conditioned space.

5. An apparaus according to claim 2 wherein the opening and closing of the valve controlled by the humidity regulator is responsive to relative humidity in the conditioned space and the opening and closing of the mechanical means controlled valve is adjustable to vary the open and closed time intervals of said control valve.

ALFRED C. BUENSOD.

REFERENCES CITED

The following references are of record in the file of this patent:

UNITED STATES PATENTS

| Number | Name | Date |
|---|---|---|
| 1,270,159 | Hodge | June 18, 1918 |
| 1,294,074 | Faber | Feb. 11, 1919 |
| 1,858,725 | Armstrong | May 17, 1932 |
| 1,860,377 | Anderson | May 31, 1932 |
| 1,960,658 | Brace | May 29, 1934 |
| 2,239,444 | Hornung | Apr. 22, 1941 |
| 2,387,562 | Brunot | Oct. 23, 1945 |

Certificate of Correction

Patent No. 2,562,375                                             July 31, 1951

ALFRED C. BUENSOD

It is hereby certified that error appears in the printed specification of the above numbered patent requiring correction as follows:

Column 4, line 11, strike out "to atomize moisture into the given space" and insert the same in line 10 after "line" and before the comma;

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*